United States Patent
Esaki et al.

(10) Patent No.: US 7,363,147 B2
(45) Date of Patent: Apr. 22, 2008

(54) NAVIGATION DEVICE AND METHOD FOR DETERMINING ORIENTATION OF VEHICLE

(75) Inventors: Motoharu Esaki, Obu (JP); Hajime Oka, Yokkaichi (JP)

(73) Assignee: DENSO CORPORATION, Kariya (JP)

(*) Notice: Subject to any disclaimer, the term of this patent is extended or adjusted under 35 U.S.C. 154(b) by 173 days.

(21) Appl. No.: 11/412,105

(22) Filed: Apr. 27, 2006

(65) Prior Publication Data

US 2006/0247854 A1 Nov. 2, 2006

(30) Foreign Application Priority Data

Apr. 28, 2005 (JP) ............................. 2005-132099
Mar. 7, 2006 (JP) ............................. 2006-061289

(51) Int. Cl.
*G01C 21/00* (2006.01)

(52) U.S. Cl. .................. 701/200; 701/216; 702/94

(58) Field of Classification Search ............... 701/200, 701/213, 214, 216, 220, 221; 702/85, 92, 702/94, 104; 342/358
See application file for complete search history.

(56) References Cited

U.S. PATENT DOCUMENTS 5,969,672 A * 10/1999 Brenner ................ 342/357.06
6,480,148 B1 * 11/2002 Wilson et al. .......... 342/357.08
6,820,025 B2 * 11/2004 Bachmann et al. ........... 702/94
6,955,542 B2 * 10/2005 Roncalez et al. ............ 434/254
7,089,148 B1 * 8/2006 Bachmann et al. .......... 702/151

FOREIGN PATENT DOCUMENTS

| JP | A-09-042979 | 2/1997 |
| JP | A-2004-125689 | 4/2004 |

* cited by examiner

*Primary Examiner*—Gary Chin
(74) *Attorney, Agent, or Firm*—Posz Law Group, PLC (57) ABSTRACT

A vehicle includes an acceleration sensor that generates an output of an acceleration in a direction of the acceleration sensor. The output of the acceleration includes information on an orientation of the acceleration sensor relative to the vehicle. A method for determining an orientation of the vehicle includes (i) detecting a first output of the acceleration sensor; (ii) memorizing the first output as a reference orientation value, (iii) correcting the memorized reference orientation value, based on an average of outputs generated by the acceleration sensor while the vehicle travels after the first output is generated; and (iv) determining an orientation of the vehicle when the vehicle travels, based on the corrected reference orientation value and a second output of the acceleration sensor.

14 Claims, 10 Drawing Sheets

NAVIGATION DEVICE AND METHOD FOR DETERMINING ORIENTATION OF VEHICLE

CROSS REFERENCE TO RELATED APPLICATION

This application is based on and incorporates herein by reference Japanese patent application No. 2005-132099 filed on Apr. 28, 2005 and No. 2006-61289 filed on Mar. 7, 2006.

FIELD OF THE INVENTION

The present invention relates to a navigation device for a vehicle, and in particular, relates to a navigation device to detect a vehicle's position by using autonomous navigation. The present invention further relates to a method for determining an orientation of a vehicle.

BACKGROUND OF THE INVENTION

A navigation device for a vehicle (for example, an automobile) reads map data including a current position of the vehicle from an external storage medium such as a DVD-ROM or a hard disk drive. The navigation device further displays a map on a display screen based on the map data and displays a mark corresponding to the current position of the vehicle on a fixed position in the display screen (for example, the center of the display screen or a position slightly below the center of the display screen). The navigation device further scrolls the map on the display screen according to travel of the vehicle.

To detect a current position of the vehicle, the navigation device uses autonomous (dead-reckoning) navigation or GPS (Global Positioning System) navigation. The autonomous navigation uses a distance sensor, a gyro sensor, or an earth magnetism sensor; the GPS navigation uses a GPS receiver to receive radio waves from satellites.

In the GPS navigation, a correct position of the vehicle can be detected since the navigation device can calculate an absolute position of the vehicle according to the radio waves from the satellites. However, the navigation device cannot detect the correct position of the vehicle in a place where the GPS receiver cannot receive the radio waves from the satellites, such as a place between tall buildings, below an elevated road, or in an indoor parking area. To cope with the problem, some recent navigation devices use the autonomous navigation in addition to the GPS navigation. More specifically, the navigation device uses the autonomous navigation when the GPS receiver cannot receive the radio waves from the satellites.

Furthermore, autonomous navigation with smaller errors has recently become more required to accurately navigate. This is because places where the GPS receiver cannot receive radio waves from the satellites are increasing. For example, these places are urban roads along tall buildings, three-dimensionally intricate highway entrances/exits/junctions; combinations of a lifted road and ground road extending mutually parallel; underground parking areas; and indoor parking areas.

The autonomous navigation needs to detect a travel distance and a heading direction of the vehicle. The travel distance can be detected by using a distance (speed) sensor installed in the vehicle. The heading direction can be detected by using a gyro sensor (for example, a vibration gyro, a gas rate gyro, a fiber optic gyro) for detecting an angular velocity. When the vehicle travels on a road with a tilt, the tilt causes an error in a travel distance displayed on a two-dimensional map. In addition, a tilt of the vehicle causes a tilt of a detection axis of the gyro sensor, which finally causes an error in the detected heading direction. In Patent Document 1, a navigation device is disclosed which detects the tilt of the road by using a triaxial acceleration sensor and corrects errors in the travel distance and heading direction of the vehicle based on the detected tilt.

Furthermore, in Patent Document 1, to use the autonomous navigation with a high accuracy, the navigation device corrects the travel distance and heading direction of the vehicle by using sensors. An angular velocity sensor is to detect angular velocities in a yaw direction and a pitch direction; an acceleration sensor is to detect accelerations in at least two of a front-rear direction, a lateral direction, and a vertical direction of the vehicle.

This needs to detect a tilt angle (or orientation), relative to the vehicle, of a casing, in which the angular velocity sensor and acceleration sensor are contained. The tilt angle should be detected when the vehicle remains in a horizontal orientation. The orientation of the vehicle is detected by using a lateral vehicle-height sensor and a pendulum type tilt sensor. Thus, this navigation device requires many sensors, which makes the navigation device more complicated.

Patent Document 1: JP 2004-125689A

SUMMARY OF THE INVENTION

It is therefore an object of the present invention to detect an orientation of a vehicle by using an acceleration sensor with a high accuracy.

In a first aspect of the present invention, a navigation device is provided in a vehicle that includes a distance sensor for detecting a travel distance of the vehicle; the navigation device is provided as follows. An acceleration sensor is included to generate outputs of accelerations in a front-rear, a lateral, and a vertical directions of the acceleration sensor. A correction unit is included to (i) detect a first group of outputs of the acceleration sensor with respect to the three directions, the first group including information on an orientation of the acceleration sensor relative to the vehicle, (ii) memorize the first group as reference orientation values, (iii) correct the memorized reference orientation values with respect to the three directions, based on three averages of outputs generated by the acceleration sensor while the vehicle travels after the first group are generated, each average being an average of outputs with respect to each of the three directions, (iv) determine an orientation of the vehicle when the vehicle travels, based on the corrected reference orientation values and a second group of outputs of the acceleration sensor with respect to the three directions, and (v) correct a travel distance detected by the distance sensor, based on the determined orientation of the vehicle.

According to the above structure of the navigation device, the correction unit detects and memorizes, as the reference orientation values, the first group of outputs of the acceleration sensor (or triaxial acceleration sensor) in the three directions of the acceleration sensor. An orientation of the vehicle while the vehicle is traveling is detected based on outputs of the acceleration sensor and the reference orientation values. If the reference orientation values are memorized while the vehicle is not in a horizontal orientation, a subsequently detected orientation of the vehicle will include errors.

Although the vehicle travels through uphill roads, downhill roads, and bank roads having tilts in their lateral directions, an average tilt of the roads (or the vehicle) becomes almost zero (i.e. horizontal) when the vehicle undergoes a long travel such as a round-trip travel to a destination.

The correction unit utilizes this tendency by correcting the orientation values based on the averages of outputs of the triaxial acceleration sensor in the respective three directions. Then the correction unit determines the orientation of the vehicle when the vehicle is traveling, based on the corrected reference orientation values and the second group of outputs of the triaxial acceleration sensor in the three directions of the triaxial acceleration sensor, and corrects, based on the determined orientation of the vehicle, the travel distance which is obtained based on the output of the distance sensor.

Thus, the reference orientation values are gradually corrected to become an optimum value corresponding to the horizontal orientation of the vehicle even if a height sensor or a tilt sensor is not used and even if the initially memorized reference orientation values correspond to an orientation which is not horizontal. As a result, an accuracy of detection of the travel distance can be improved without making the navigation device more complex and the current position of the vehicle can be calculated with a high accuracy.

In a second aspect of the present invention, a navigation device is provided in a vehicle, which includes a distance sensor for detecting a travel distance of the vehicle; the navigation device is provided as follows. An acceleration sensor is included to generate an output of an acceleration in a front-rear direction of the acceleration sensor, the output including information on an orientation of the acceleration sensor relative to the vehicle. A correction unit is included to (i) detect a first output of the acceleration sensor, (ii) memorizes the first output as a reference orientation value, (iii) correct the memorized reference orientation value, based on an average of outputs generated by the acceleration sensor while the vehicle travels after the first output is generated, (iv) determine an orientation of the vehicle when the vehicle travels, based on the corrected reference orientation value and a second output of the acceleration sensor, and(v) correct a travel distance detected by the distance sensor, based on the determined orientation of the vehicle.

According to the second aspect, it is possible to detect the orientation of the vehicle by using an acceleration sensor with a high accuracy and to then detect the travel distance with a high accuracy.

In a third aspect of the present invention, a method determines an orientation of a vehicle, which includes an acceleration sensor generating an output of an acceleration in a direction of the acceleration sensor, the output including information on an orientation of the acceleration sensor relative to the vehicle. The method is provided with the following: (i) detecting a first output of the acceleration sensor; (ii) memorizing the first output as a reference orientation value; (iii) correcting the memorized reference orientation value, based on an average of outputs generated by the acceleration sensor while the vehicle travels after the first output is generated; and (iv) determining an orientation of the vehicle when the vehicle travels, based on the corrected reference orientation value and a second output of the acceleration sensor.

According to the third aspect, it is possible to detect the orientation of the vehicle by using an acceleration sensor with a high accuracy.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE PREFERRED EMBODIMENTS

First Embodiment

Figure 1:
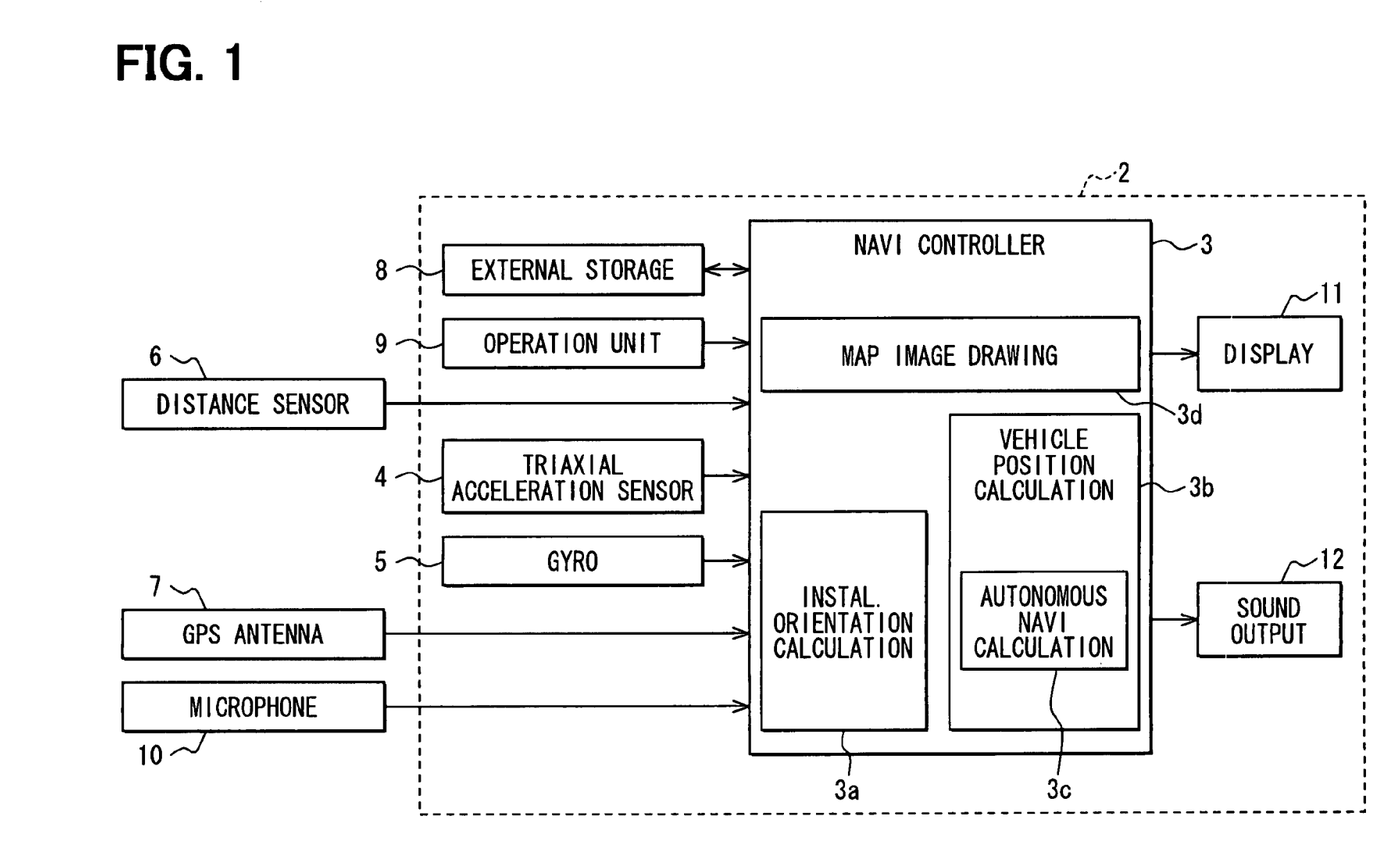
FIG. 1 is a block diagram showing a navigation device according to a first embodiment of the present invention.

Hereinafter, a first embodiment of the present invention will be described with reference to FIGS. 1 to 9. As shown in FIG. 1, a navigation device 2 is installed in a vehicle 1 (see FIG. 3) such as an automobile and includes a navigation controller 3, a triaxial acceleration sensor 4, a gyro sensor 5, an external storage device 8, an operation unit 9, a display 11, and a sound output device 12.

The navigation controller 3 includes a microcomputer and other electrical parts. More specifically, the navigation controller 3 includes an installation orientation calculation unit 3a, a vehicle position calculation unit 3b, an autonomous navigation calculation unit 3c, and a map image drawing unit 3d. The installation orientation calculation unit 3a calculates a tilt of a casing 13 of the navigation device 2 and makes a correction as described later. The installation orientation calculation unit 3a hence serves as an example of a correction unit.

The triaxial acceleration sensor 4 detects a tilt of the casing 13. The gyro sensor (or an azimuth direction sensor) 5 detects a heading direction of the vehicle 1. The triaxial acceleration sensor 4 and the gyro sensor 5 are installed in the casing 13 and connected with the navigation controller 3.

A distance sensor 6 is installed in the vehicle 1 and detects a travel distance of the vehicle 1. A GPS antenna 7 is also installed in the vehicle 1 and receives GPS radio waves when GPS navigation is made. The distance sensor 6 and the GPS antenna 7 are also connected with the navigation controller 3.

The external storage device 8 stores data such as map data necessary for navigation, and includes a CD-ROM, a DVD-ROM, and/or a hard disk drive. The external storage device 8 is also connected with the navigation controller 3. The operation unit 9 is for controlling externally the navigation device 2 and includes key switches, touch switches, and remote controlling switches. A voice microphone 10 is for controlling the navigation device 2 by voice. The operation unit 9 and the voice microphone 10 are also connected with the navigation controller 3. The data necessary for the navigation may be obtained not from the external storage device 8 but from a service center (which serves as a data storage unit) through a communication network such as the Internet.

The display 11 which serves as a display unit is for displaying a current position mark on a map including a current position of the vehicle 1. The display 11 is also for displaying (i) information for finding a destination among many candidates for the destination, (ii) a recommended route to the destination, and (iii) guidance information of the recommended route. The display 11 may include a color LCD display device. The sound output device 12 gives route guidance to a user by voice. The display 11 and sound output device 12 are also connected with the navigation controller 3.

Figure 2:
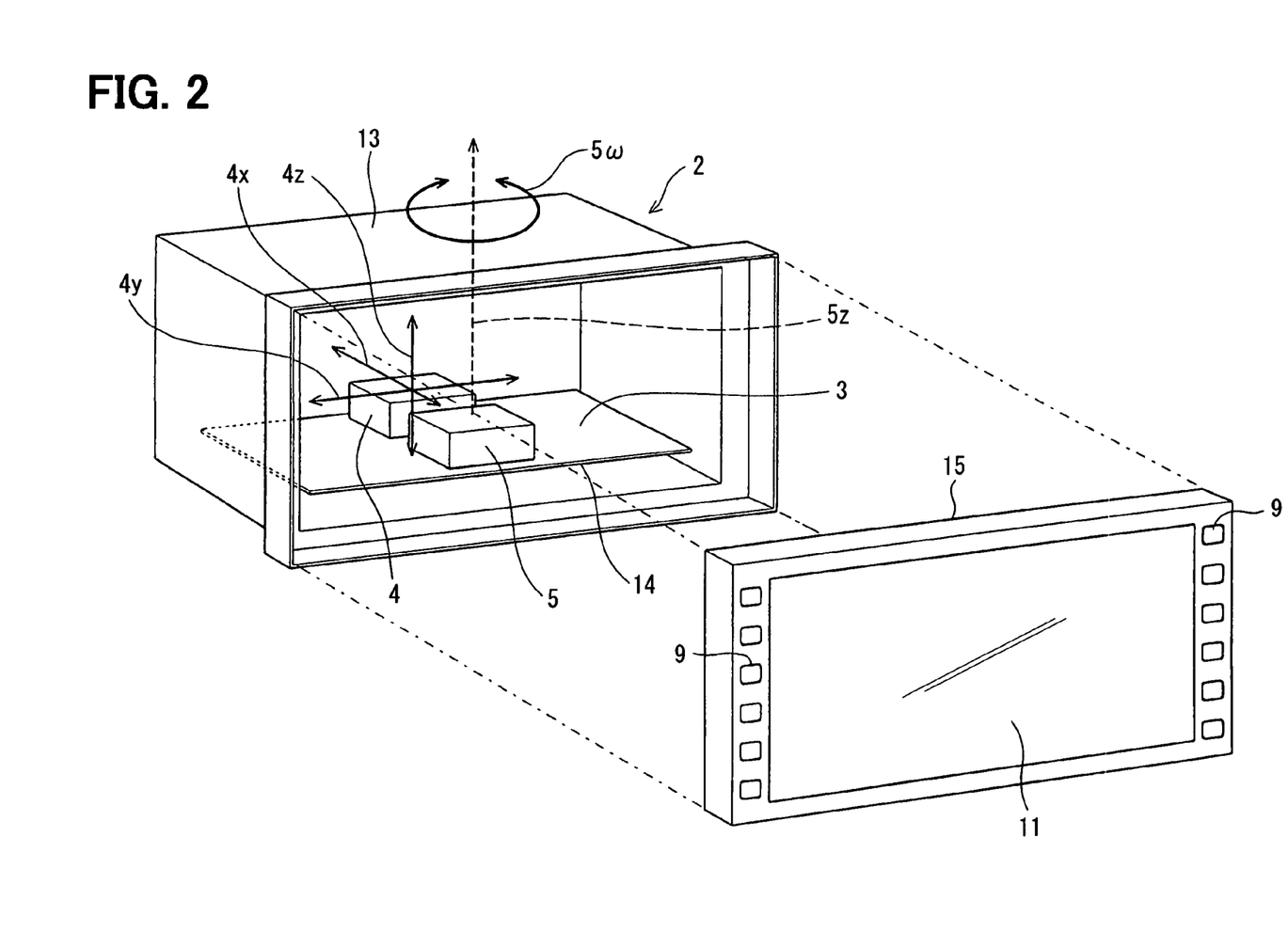
FIG. 2 is an exploded perspective view showing the navigation device.

As shown in FIG. 2, a printed circuit 14, which is a part of the navigation controller 3, is located in the casing 13 parallel to the bottom surface of the casing 13. The navigation controller 3, the triaxial acceleration sensor 4, and the gyro sensor 5 are attached on the printed circuit 14 so that they are located in the same plane with the printed circuit 14. A front panel 15 in which the operation unit 9 and the display 11 are installed is located at a front side of the casing 13. Thus, the navigation device 2 is a built-in display navigation device.

In FIG. 2, a detection axis 4x indicates a direction in which the triaxial acceleration sensor 4 detects an acceleration in its front-rear direction. A detection axis 4y indicates a direction in which the triaxial acceleration sensor 4 detects an acceleration in its lateral direction. A detection axis 4z indicates a direction in which the triaxial acceleration sensor 4 detects an acceleration in its vertical direction. A detection axis 5z indicates an axis around which the gyro sensor 5 detects its angular velocity 5ω.

For ease of explanation, it is assumed in this embodiment that the detection axes 4x, 4y, and 4z are parallel to, respectively, installation axes x, y, and z (see FIG. 3) indicating an orientation of the navigation device 2 (or the casing 13) installed to the vehicle 1. In addition, the detection axis 5z is parallel to the installation axis z. The detection axis 4x, 4y, 4z, and 5z may be tilted against the installation axes x, y, and z.

Figure 3A:
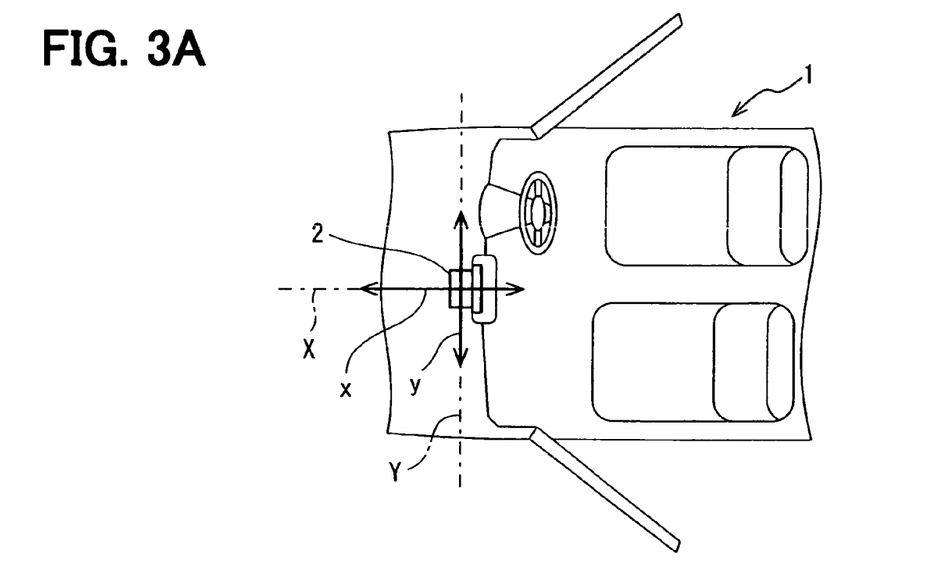
FIGS. 3A-3C are schematic views showing a location of the navigation device in a vehicle.
Figure 3B:
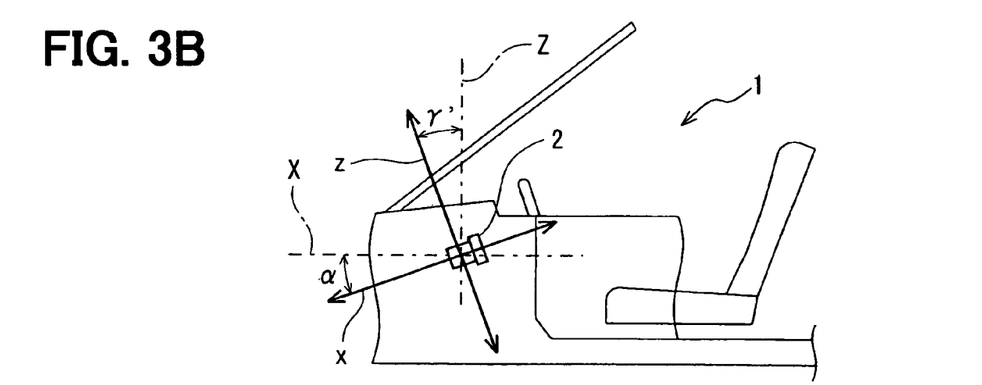
Figure 3C:
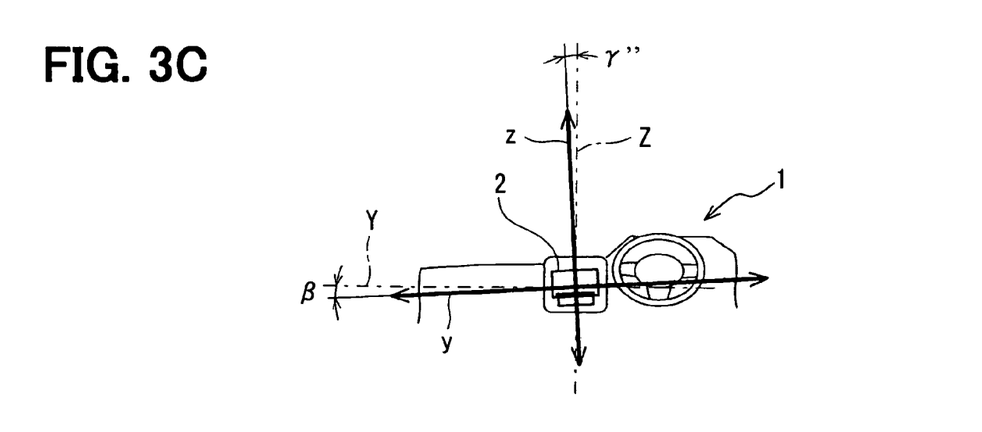

FIGS. 3A, 3B, and 3C are, respectively, a top view, a side view, and a rear view showing how the navigation device 2 is installed in the vehicle 1. As shown in FIGS. 3A to 3C, a reference axis X indicates a front-rear direction of the vehicle 1 and the installation axis x indicates a front rear direction of the navigation device 2. In other words, the installation axis x indicates the detection axis 4x of the triaxial acceleration sensor 4. A reference axis Y indicates a lateral direction of the vehicle 1 and the installation axis y indicates a lateral direction of the navigation device 2. In other words, the installation axis y indicates the detection axis 4y of the triaxial acceleration sensor 4. A reference axis Z indicates a vertical direction of the vehicle 1 and the installation axis z indicates a vertical direction of the navigation device 2. In other words, the installation axis z indicates the detection axis 4z of the triaxial acceleration sensor 4 and the detection axis 5z of the gyro sensor 5.

In a normal situation, the navigation device 2 is installed with its front side facing the driver's seat of the vehicle 1. An angle a in FIG. 2B shows a tilt of the installation axis x (or the detection axis 4x) against the reference axis X in the front-rear direction of the vehicle. An angle β in FIG. 2C shows a tilt of the installation axis y (or the detection axis 4y) against the reference axis Y in the lateral direction of the vehicle. An angle in FIG. 2B shows a tilt of the Installation axis z (or the detection axis 4z, 5z) against the reference axis Z in the front-rear direction of the vehicle 1. An angle in FIG. 2C shows a tilt of the installation axis z (or the detection axis 4z, 5z) against the reference axis Z in the lateral direction of the vehicle 1. The installation axes x, y, z are perpendicular to each other. Therefore, the angle α is equal to angle γ'; the angle β is equal to the angle γ".

Figure 4:
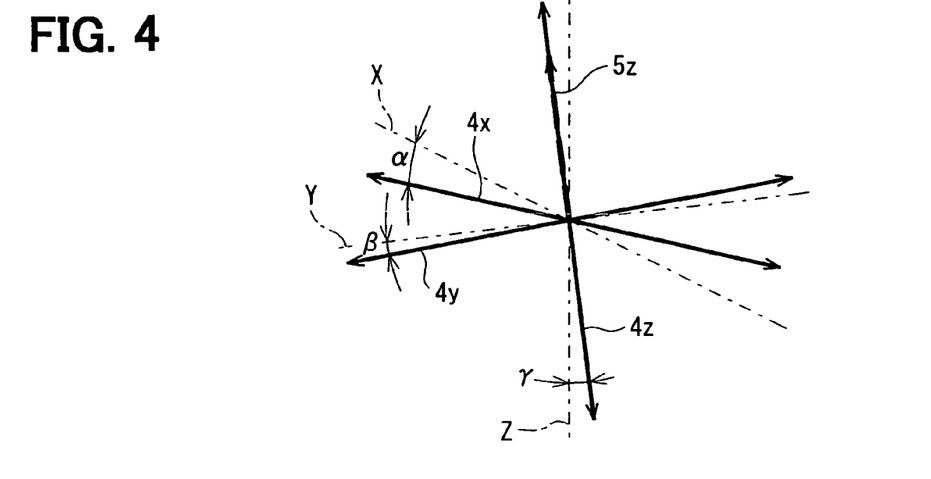
FIG. 4 is a schematic view showing a relation between reference axes and detection axes of a triaxial acceleration sensor and a gyro sensor which are installed in the vehicle with a tilt.

FIG. 4 shows a relation between a group of the detection axes 4x, 4y, 4z, and 5z and a group of the reference axes X, Y, and Z. This relation occurs when the navigation device 2 is installed in the vehicle 1 with an orientation having a tilt angle α against the reference axis X in the front-rear direction, a tilt angle β against the reference axis Y in the lateral direction, and a tilt angle γ against the reference axis Z in the vertical direction.

When the triaxial acceleration sensor 4 is in a horizontal orientation, the gravitational acceleration g is perpendicular to the detection axis 4x and therefore the triaxial acceleration sensor 4 outputs a signal indicating "null" as a detection signal regarding the detection axis 4x. In contrast, the gravitational acceleration g is parallel to the detection axis 4z and therefore the triaxial acceleration sensor 4 outputs a signal indicating "1G" as a detection signal regarding the detection axis 4z.

Figure 5A:
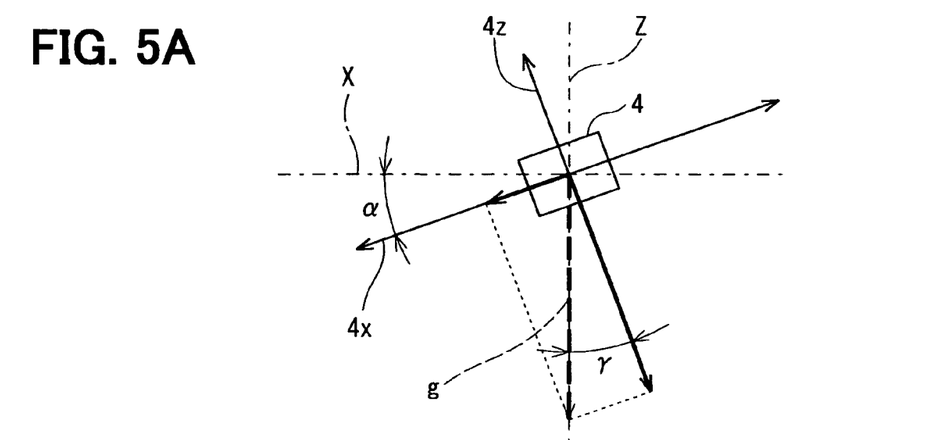
FIG. 5A is a schematic view showing how the triaxial acceleration sensor functions.
Figure 5B:
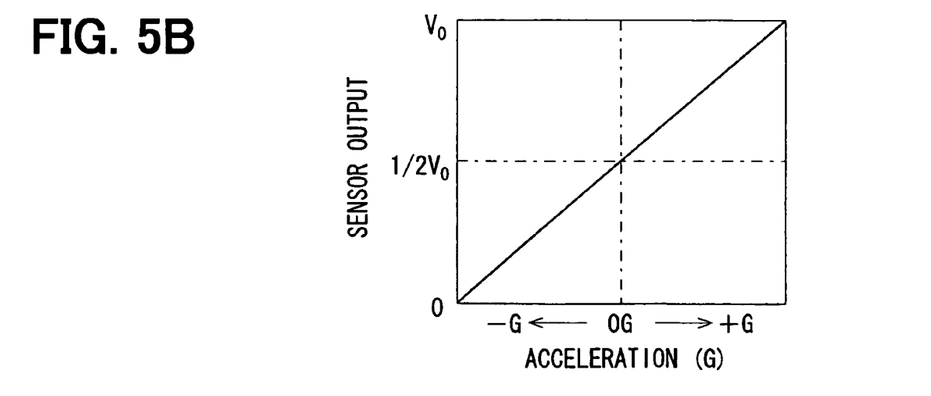
FIG. 5B is a graph showing output characteristics of the triaxial acceleration sensor.

When the triaxial acceleration sensor 4 is tilted, as shown in FIG. 5A, by an angle a against the reference axis X in the front-rear direction, the detection axis 4z of the triaxial acceleration sensor 4 is tilted against the direction of the gravitational acceleration g. The triaxial acceleration sensor 4 outputs a signal indicating "not null" as a detection signal regarding the detection axis 4x. By measuring the outputted signal, the tilt angle of the triaxial acceleration sensor 4 can be detected. In order to linearly detect both positive and negative acceleration, the outputted voltage of the signal becomes the middle value when the detected acceleration is "0G," as shown in FIG. 5B. The detection axes 4y and 4z have output characteristics similar to those of the detection axis 4x.

Figure 6A:
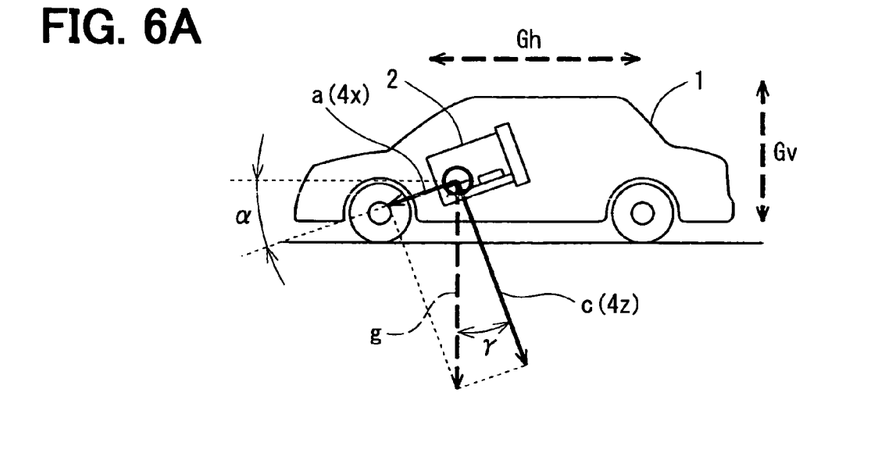
FIGS. 6A-6C are schematic views showing behavior of the vehicle having the navigation device.
Figure 6B:
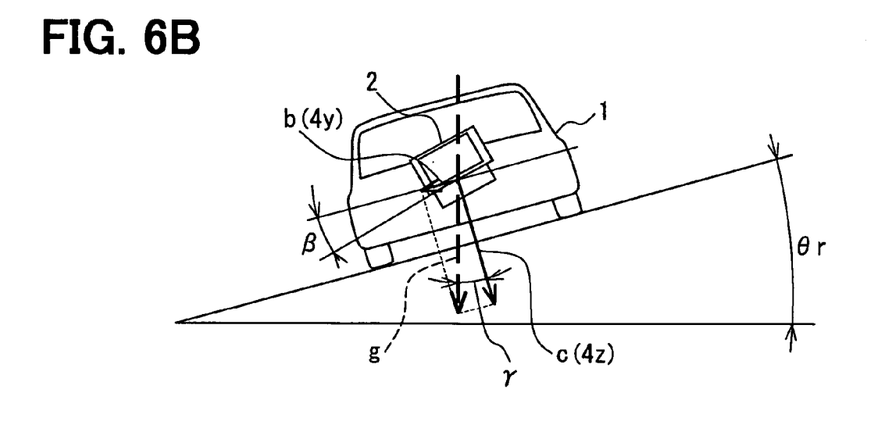
Figure 6C:
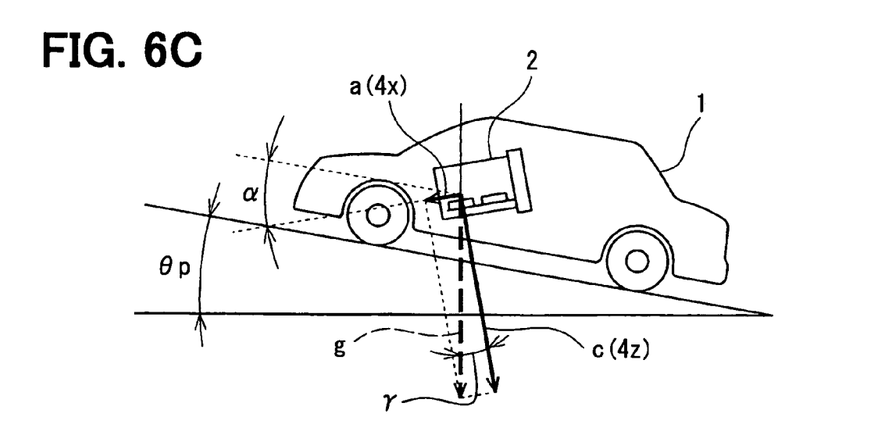

In the situations shown in FIGS. 6A to 6C, the navigation device 2 is tilted in the vehicle 1. In FIG. 6A, the vehicle 1 is in a horizontal orientation. In FIG. 6B, the vehicle 1 is traveling on a road tilted by an angle θr in a lateral direction. In FIG. 6C, the vehicle 1 is traveling on an uphill slope with a tilt angle θp. For example, in FIG. 6A, outputs a, b, and c regarding the respective detection axis 4x, 4y, 4z of triaxial acceleration sensor 4 have relations as the equations (1), (2), and (3) below:

$$a = g \cdot \sin \alpha \quad (1)$$

$$b = 0 \quad (2)$$

$$c = g \cdot \cos \alpha \quad (3)$$

As shown in FIG. 6A, an acceleration Gh and Gv may be applied to the triaxial acceleration sensor 4. The acceleration Gh is caused by increase or decrease of the speed of the vehicle 1, and the acceleration Gv is caused by vibration of the vehicle 1 in its vertical direction. The outputs a, b, and c are affected by the accelerations Gh and Gv.

Hereinafter, the operation of the navigation device 2 will be described with reference to FIGS. 7 to 9. The navigation controller 3 executes a process shown in FIG. 7 when the navigation device 2 starts receiving electric power. At Step S1, the navigation controller 3 makes a determination whether it is the first time that the navigation device 2 starts receiving electric power since the navigation device 2 is installed in the vehicle 1. When the determination at Step S1 is affirmative, the navigation controller 3 makes at Step S2 a determination whether or not the vehicle 1 is keeping still (stopping) based on whether or not the travel distance detected by the distance sensor 6 is zero.

When the determination at Step S2 is affirmative, the navigation controller 3 receives, at Step S3, outputs a, b, and c regarding the detection axes $4x$, $4y$, and $4z$ of the triaxial acceleration sensor 4. Subsequently at Step S4, the navigation controller 3 stores the received outputs a, b, and c into, for example, a nonvolatile storage medium (such as an EEPROM or a flash memory not shown) as a reference orientation value A, B, and C, respectively.

At Step S5, the navigation controller 3 causes the nonvolatile storage medium to additionally memorize processing data. This data indicates that the reference orientation values A, B, and C are memorized when the navigation device 2 started receiving the electric power for the first time after being installed in the vehicle 1.

Figure 9:
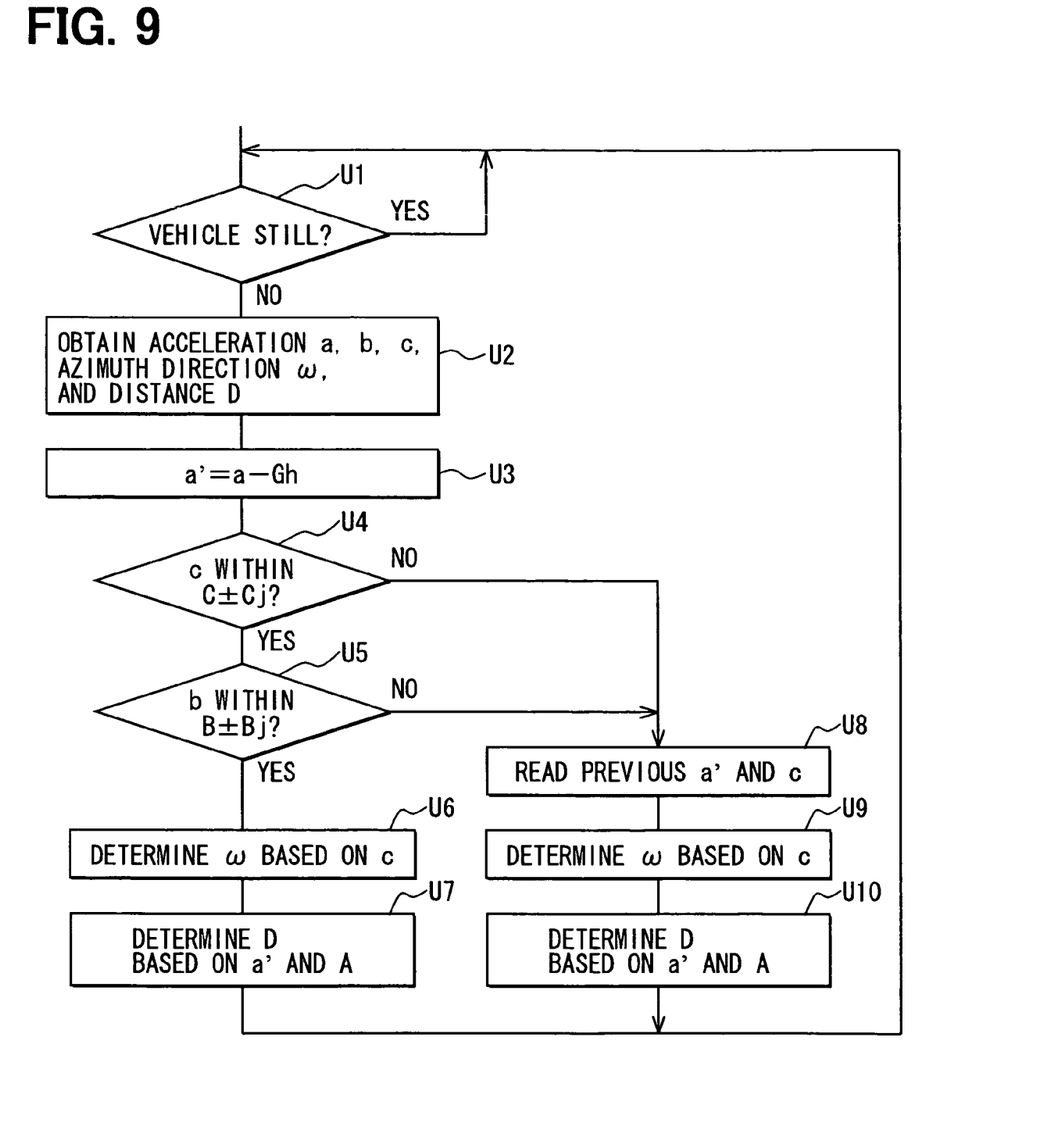
FIG. 9 is a flowchart showing an operation for correcting errors in an orientation and a travel distance of the vehicle by using the reference orientation values.

The reference orientation values A, B, and C indicate tilt angles of the casing 13 against the vehicle 1, and are used for correcting the travel distance when the vehicle 1 is traveling (see FIG. 9). The reference orientation values A, B, and C therefore should be obtained when the vehicle 1 is in a horizontal orientation. Thus the electric power is preferably supplied to the navigation device 2 when the vehicle 1 is put on a horizontal surface just after the navigation device 2 is installed in the vehicle 1.

However, the vehicle 1 may not be in a horizontal orientation when the reference orientation values A, B, and C are obtained and stored at Steps S3 and S4. For example, while the vehicle 1 is tilted, the navigation device 2 is supplied with electric power by a user who installs the navigation device 2 by himself/herself. At a time when the Steps S3 and S4 are executed, it is unclear whether the reference orientation values A, B, and C are obtained when the vehicle 1 is in a horizontal orientation.

The navigation controller 3 corrects, as described late, the reference value A, B, and C while the vehicle 1 is traveling. The navigation controller 3 determines at Step S6 a power-on value k1 as a correction coefficient k and stores the power-on value k1 into the nonvolatile storage medium. Subsequently, the navigation controller 3 ends the process for memorizing the reference orientation values.

The processing data stored in the nonvolatile memory at Step S5 indicate that the navigation controller 3 has already executed the process for memorizing the reference orientation values, by being referred to when the navigation device 2 starts receiving the electric power next time. The determination at Step S1 therefore becomes negative and the navigation controller 3 ends the process for memorizing the reference orientation values, when the navigation device 2 receives the electric power next time.

Hereinafter, examples of the process for memorizing the reference orientation values are described. The tilt angles of the navigation device 2 against the vehicle 1 are determined based on a relation between an installation position of the navigation device 2 and a position of eyes of a driver. The tilt angle in the front-rear direction is therefore large and the tilt angle in the lateral direction is therefore small. For example, when the tilt angle α in the front-rear direction is 20 degrees and the tilt angle β in the lateral direction is 0 degree, the reference orientation values A (or a), B (or b), and C (or c) becomes the following, according to the equations (1) to (3), $$A \text{ (or } a) = g \cdot \sin(20 \text{ deg}) = 0.342G \quad (1)$$

$$B \text{ (or } b) = 0 \quad (2)$$

$$C \text{ (or } c) = g \cdot \cos(20 \text{ deg}) = 0.94G \quad (3)$$

Figure 7:
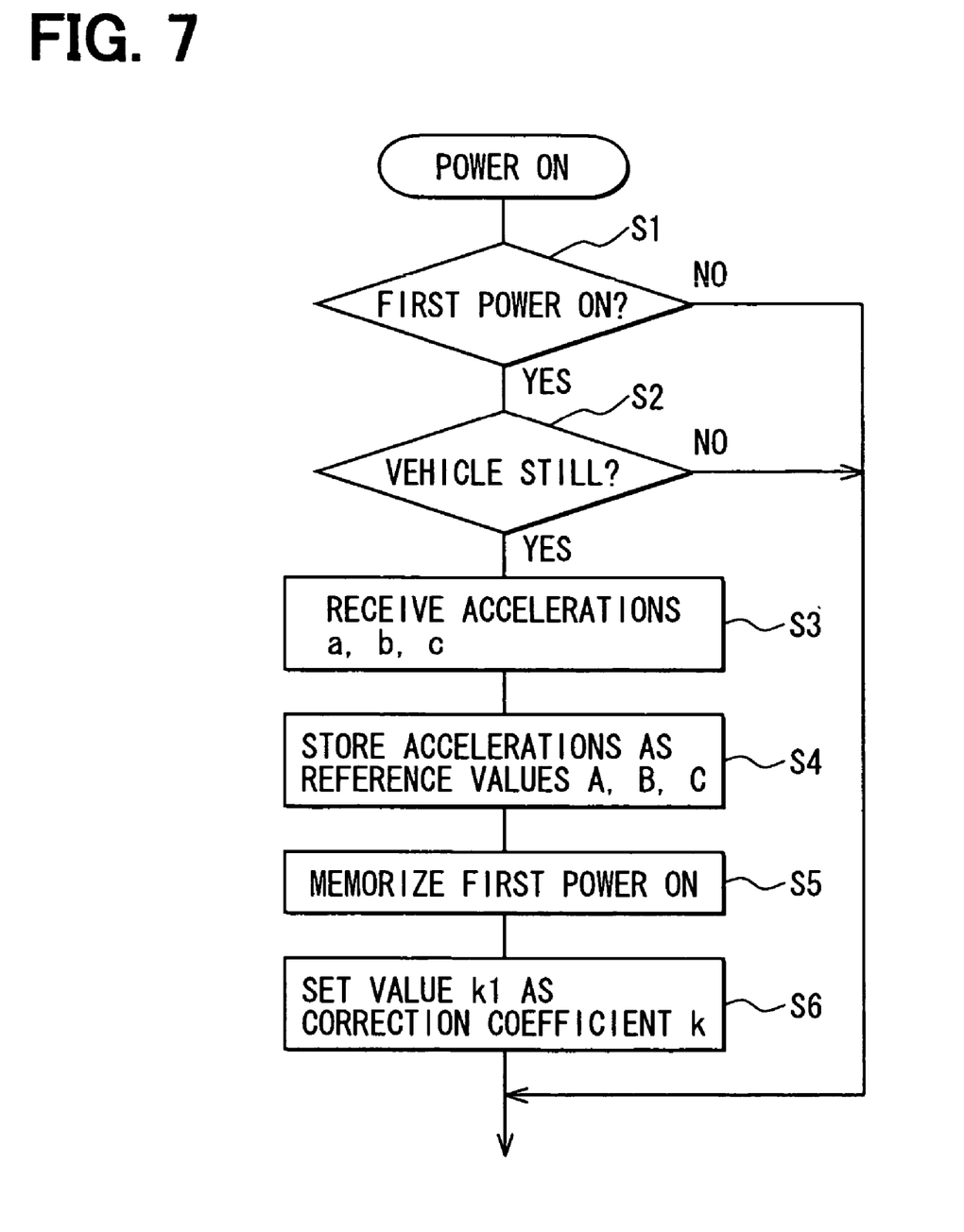
FIG. 7 is a flowchart showing an operation for obtaining reference orientation values.
Figure 8:
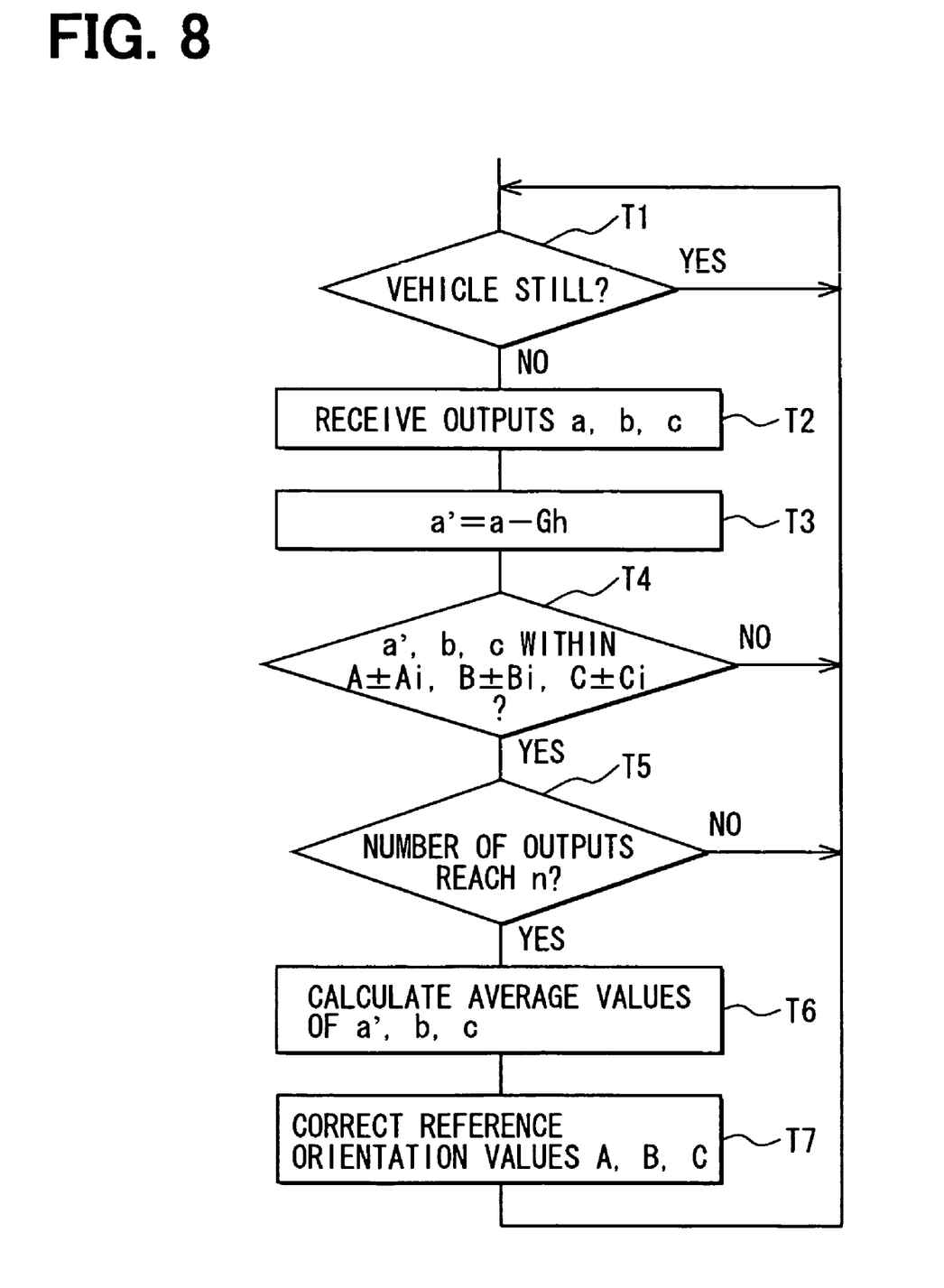
FIG. 8 is a flowchart showing an operation for correcting reference orientation values.

The navigation controller 3 executes a process shown in FIG. 8 for correcting the reference orientation values A, B, and C which were initially memorized at Step S4 in the process shown in FIG. 7. Although the vehicle 1 travels through uphill roads, downhill roads, and roads having tilts in their lateral directions, an average tilt of the roads (or the vehicle 1) becomes almost zero (i.e. horizontal) when the vehicle 1 undergoes a long travel such as a round-trip travel to a destination.

The navigation controller 3 utilizes this tendency by correcting the reference orientation values A, B, and C based on average values of the outputs a, b, and c of the triaxial acceleration sensor 4, respectively. The navigation controller 3 does not correct the reference orientation values A, B, and C when the vehicle 1 is not traveling. When the vehicle 1 is keeping still, the vehicle 1 may be kept tilted for a long time, thereby modifying the reference orientation values A, B, and C to resemble values corresponding to the tilted state of the vehicle.

In FIG. 8, the navigation controller 3 makes at Step T1 a determination whether the navigation controller 3 is keeping still or not. When the determination at Step T1 is negative, in other words, when the vehicle 1 is traveling, the navigation controller 3 receives, at Step T2, outputs a, b, and c of the triaxial acceleration sensor 4. When the vehicle 1 is traveling, the output a regarding the detection axis $4x$ may be affected by the acceleration Gh caused by change of the speed of the vehicle 1 and the output c regarding the detection axis $4z$ may be affected by the acceleration Gv caused by the vertical vibration of the vehicle 1. The navigation controller 3 eliminates these effects on the output a, b, and c when the vehicle 1 is traveling.

For example, the navigation controller 3 calculates the acceleration Gh based on travel time and the travel distance detected by the distance sensor 6. The navigation controller 3 then calculates at Step T3 an output a' which is obtained by subtracting the calculated acceleration Gh from the output a regarding the detection axis $4x$ of the triaxial acceleration sensor 4. In a normal situation, the tilt of the road in the lateral direction is not large. Therefore, the output b of the triaxial acceleration sensor 4 is not corrected. In a normal situation, the vehicle 1 has suspension springs which damps the vertical vibration of the vehicle 1. Therefore, the output c of the triaxial acceleration sensor 4 is not corrected. However, the navigation controller 3 eliminates effects caused by large vertical vibration of the vehicle 1 at Step T4 described later. Thus, the navigation controller 3 obtains the outputs a', b, and c which are similar to the reference orientation value A, B, C.

The navigation controller 3 makes at Step T4 a determination whether the obtained outputs a', b, and c are within ranges from A−Aj to A+Aj, from B−Bj to B+Bj, and from C−Ci to C+Ci, respectively. The correction tolerance values Ai, Bi, and Ci are predetermined based on the increase or the decrease of speed of the vehicle 1 and characteristics of the suspension springs in damping the vertical vibration.

In the case that the determination at Step T4 is negative, it is likely that the obtained outputs have an effect of a large disturbance such as a corner bank, pavement stones, railway tracks, and a bump in a road. In this case, the navigation controller 3 discards the obtained outputs and obtains new outputs a', b, and c.

When the determination at Step T4 is affirmative, the navigation controller 3 repeats executing Steps T1 to T4 until it makes at Step T5 an affirmative determination that the number of sets of outputs a', b, and c reaches a number which is more than unity. When the navigation controller 3 makes the affirmative determination at Step T5, it calculates at Step T6 average values a', b, and c in the obtained sets.

Then the navigation controller 3 corrects at Step T7 the reference orientation values A, B, and C, by calculating weighted averages of the average values a', b, and c obtained at Step T6 and the present reference orientation values A, B, and C, respectively. The above mentioned correction coefficient k (equal to k1 in this embodiment) is a weight used for calculating the weighted averages. Calculation of the weighted average serves as a filter for the outputs a', b, and c. The reference orientation values A, B, and C are gradually corrected depending on the correction coefficient k.

The navigation controller 3 corrects the reference orientation value A by using the equation (4):

$$A = k \frac{\sum_{i=1}^{n} a_i}{n} + (1-k)A \qquad (4)$$

The reference orientation values B and C are corrected by using equations similar to the equation (4).

The correction tolerance values Ai, Bi, and Ci may be set to be several percents of the reference orientation values A, B, and C, respectively. Thus, the outputs including a large disturbance are excluded. The number n may be in a range from several thousands to several ten thousands. The correction coefficient k, which weights the average value a', b, or c obtained at Step T6, may be several percents.

The navigation controller 3 executes a process shown in FIG. 9 to calculate a current position of the vehicle 1 based on the corrected reference orientation value A, B, and C. The navigation controller 3 makes at Step U1 a determination whether the navigation controller 3 is keeping still or not. When the determination at Step U1 is negative, in other words, when the vehicle 1 is traveling, the navigation controller 3 detects the current position of the vehicle 1. More specifically, while the vehicle 1 is traveling, the navigation controller 3 obtains at Step U2 average outputs a, b, c, the angular velocity ω from the gyro sensor 5, and the travel distance D every predetermined interval (for example, 10 to 100 milliseconds) or every predetermined travel distance (for example, several to over ten meters). The angular velocity ω servers as azimuth direction data. The average output a is an average of the outputs a obtained for n times. The average output b is an average of the outputs b obtained for n times. The average output c is an average of the outputs c obtained for n times. The travel distance D has been calculated by the navigation controller 3 in another process. Subsequently at Step U3, the navigation controller 3 calculates the output a' by subtracting from the obtained output a the acceleration Gh caused by the increase or the decrease of the speed of the vehicle 1.

The navigation controller 3 makes at step U4 a determination whether the vehicle 1 is free from vertical vibration based on whether the obtained output c regarding the detection axis 4z is within a range from C−Cj to C+Cj; the value C is the reference orientation value regarding the detection axis 4z. The correction tolerance value Cj is predetermined based on the increase or the decrease of the speed of the vehicle 1 and characteristics of the suspension springs in damping the vertical vibration.

When the determination at Step U4 is affirmative, the navigation controller 3 makes at Step U5 a determination whether an effect of the tilt in the lateral direction of the road which the vehicle 1 is traveling is small or not, based on whether the obtained output b regarding the detection axis 4y is within a range from B−Bj to B+Bj, where the value B is the reference orientation value regarding the detection axis 4y and the correction tolerance value Bj is predetermined. When the determination at Step U5 is affirmative, the navigation controller 3 determines at Step U6 the angular velocity ω based on the obtained output c and subsequently determines at Step U7 the travel distance D based on the calculated output a' and the reference orientation value A.

When the determination at Step U4 is negative, in other words, when the vehicle 1 is not free from the vertical vibration, the navigation controller 3 subsequently executes Step U8. When the determination at Step U5 is negative, in other words, when the effect of the tilt in the lateral direction of the road which the vehicle 1 is traveling is not small, the navigation controller 3 subsequently executes Step U8.

At Step U8, the navigation controller 3 discards the currently obtained outputs a' and c and reads from a memory a previously obtained correct outputs a' and c which are more correct than the currently obtained ones. The correct outputs a' and c are stored in the memory at least until the navigation controller 3 determines that the newly obtained outputs a' and c are correct. The navigation controller 3 subsequently determines at Step U9 the angular velocity ω based on the read output c, and subsequently determines at Step U10 the travel distance D based on the read output a' and the reference orientation value A.

The azimuth direction of the vehicle 1 is determined by calculating time integral of the angular velocity ω outputted by the gyro sensor 5. It is known that the outputted angular velocity ω decreases when the detection axis 5z is tilted. In the case that the detection axis 5z is tilted by an angle γ against the vertical direction, the outputted angular velocity ω decreases as shown in the equation, $$\omega = \omega v \cdot \cos \gamma, \qquad (5)$$

wherein the value ωv is an angular velocity outputted by the gyro sensor 5 if the detection axis 5z were not tilted against the vertical direction.

Since the navigation device 2 is tilted against the vehicle 1, sensitivity of the gyro sensor 5 decreases as shown in the equation (5) even if the vehicle 1 is traveling on a horizontal road as shown in FIG. 6A. In the case that the navigation device 2 is tilted by 20 degrees against the vehicle 1, the sensitivity of the gyro sensor 5 decreases by 6%. In this case, the gyro sensor 5 outputs angular velocity which indicates that the vehicle 1 has turned by 84.5 degrees, although the vehicle 1 has turned by 90 degrees. Thus, the gyro sensor 5 causes a direction error. In order to cope with the problem, the navigation controller 3 calculates at Step U6 and U9 the angular velocity ω by calculating the tilt angle γ (or cos γ) based on the obtained output c and correcting the obtained angular velocity ω based on the calculated tilt angle γ (or cos γ) according to the equation (5).

The reference orientation value A corresponds to the tilt angle α against the vehicle 1 in the forward-rear direction of the vehicle 1. The output a' corresponds to a difference of the tilt angle α and the tilt angle θp in the heading direction of the road on which the vehicle 1 is traveling. The tilt angle θp of the road is therefore determined by calculating the tilt angle α based on the reference orientation value A, calculating the tilt angle (α-θp) based on the output a', and subtracting the calculated angle α from the calculated angle (α-θp). By using the determined tilt angle θp, the navigation controller 3 can eliminate a difference between a travel distance which is displayed on the display 11 and an actual travel distance which the vehicle 1 has actually traveled.

Thus, the navigation device 2 of this embodiment detects an orientation of the casing 13 relative to the vehicle 1 by detecting acceleration outputs a, b, and c regarding the respective detection axes 4x, 4y, and 4z of the triaxial acceleration sensor 4. Then the navigation controller 3 memorizes the outputs a, b, and c as the reference orientation values A, B, and C, respectively. In order to detect the orientation of the vehicle 1 correctly, the memorized reference orientation values A, B, and C should be values which were detected while the vehicle 1 was in a horizontal orientation. In this embodiment, the vehicle 1 is placed on a horizontal surface and then the navigation device 2 is supplied with the electric power for the first time. The navigation device 2 therefore can memorize the reference orientation values A, B, and C which correctly correspond to a situation where the vehicle 1 is in a horizontal orientation.

Even if the reference orientation values A, B, and C is detected and memorized when the vehicle 1 is not in a horizontal orientation, it is possible to modify the memorized reference orientation values A, B, and C into correct values corresponding to the situation where the vehicle 1 is in a horizontal orientation. More specifically, although the vehicle 1 travels through uphill roads, downhill roads, road having tilts in their lateral directions as well as horizontal roads, an average tilt of the roads (or the vehicle 1) becomes almost zero (i.e. horizontal) when the vehicle 1 takes a long travel. In this embodiment, the navigation device 2 gradually corrects the reference orientation values by means of filtering in which the navigation device 2 calculates three weighted averages of outputs a, b, and c of the triaxial acceleration sensor 4 and present reference orientation values A, B, and C respectively while the vehicle 1 is traveling.

The navigation device 2 therefore does not have to use a sensor (for example, a vehicle height sensor or a tilt angle sensor) dedicated for detecting the orientation of the vehicle 1. Thus the navigation device 2 can correctly detect the orientation of the vehicle 1 with simpler and lower-cost configuration than ever. Then the navigation device 2 corrects the travel distance D by using the detected orientation of the vehicle 1. The navigation device 2 therefore displays on the display 11 a correct current position of the vehicle 1 on the two dimensional map while calculating the current position by using autonomous navigation. In addition, the navigation device 2 corrects the angular velocity ω by using the output c regarding the detection axis 4z of the triaxial acceleration sensor 4. The navigation device 2 can thus detect with high accuracy the heading direction of the vehicle 1 and therefore detect with high accuracy the current position of the vehicle 1.

In addition, in correcting the reference orientation value A, B, and C the navigation device 2 subtracts from the output a of the triaxial acceleration sensor 4 the acceleration Gh corresponding to the increase and the decrease of the speed of the vehicle 1. Furthermore, the navigation device 2 excludes outputs a', b, and c from data for correcting the reference orientation value A, B, and C, if the outputs a', b, and c are out of predetermined ranges. Thus the outputs a', b, and c affected by a large error factor (or external disturbance) are excluded from data for correcting the reference orientation value A, B, and C. The navigation device 2 therefore reduces errors from external disturbance in modifying the reference orientation values A, B, and C into correct values corresponding to the state in which the vehicle 1 is in a horizontal orientation.

In the case that navigation device 2 includes three dimensional map data having information regarding heights, it is possible to determine a height of the current position of the vehicle 1 based on the detected tilt angle of the road on which the vehicle 1 is traveling; therefore, it is possible to display correct current position of the vehicle i on the three dimensional map.

Second Embodiment

Hereinafter, a second embodiment of the present invention will be described with reference to FIGS. 1 and 10. In the first embodiment, the navigation controller 3 automatically obtains and memorizes the reference orientation values A, B, and C (hereinafter referred to as automatic reference orientation values) irrespective of whether the vehicle 1 is in a horizontal orientation or not. Therefore, it is not certain whether the vehicle 1 was in a horizontal orientation when the automatic reference orientation values are obtained and memorized. Thus, the automatic reference orientation values may include errors.

In this embodiment, the navigation controller 3 obtains and memorizes the reference orientation values A, B, and C when the navigation controller 3 determines that the vehicle 1 is in a horizontal orientation. More specifically, the navigation controller 3 makes at Step S7 a determination whether the user (for example, a driver) makes sure that the vehicle 1 is in a horizontal orientation and uses the operation unit 9 or the voice microphone 10 to request for starting a process for memorizing the reference orientation values.

When the determination at Step S7 is affirmative, the navigation controller 3 makes at step S2 a determination based on the output from the distance sensor 6 whether the vehicle 1 is keeping still or not. When the determination at Step S2 is affirmative, the navigation controller 3 obtains at Step S3 the outputs a, b, and c regarding the respective detection axes 4x, 4y, and 4z of the triaxial acceleration sensor 4 and stores at Step S4 the obtained outputs a, b, and c as reference orientation values (hereinafter referred to as operated reference orientation values) A, B and C. The navigation controller 3 subsequently stores at step S8, into the nonvolatile storage medium, process data indicating that the operated reference orientation values A, B, and C are stored based on an operation of the user. The navigation controller 3 subsequently stores a power-on value k2 as a correction coefficient k into the nonvolatile storage medium and then ends the process for memorizing the reference orientation values.

Thus the navigation controller 3 memorizes the operated reference orientation values when a certain operational condition is satisfied. The certain operational condition is, in the second embodiment, that the user uses the operation unit 9 or the voice microphone 10 in a certain way and the vehicle 1 is keeping still.

Thus, the navigation controller 3 according to the second embodiment can store more than once the operated reference orientation values A, B, and C based on user's operations. In contrast, the navigation controller 3 according to the first embodiment stores only once the automatic reference orientation values A, B, and C when the navigation device 2 is supplied with the electric power for the first time.

Figure 10:
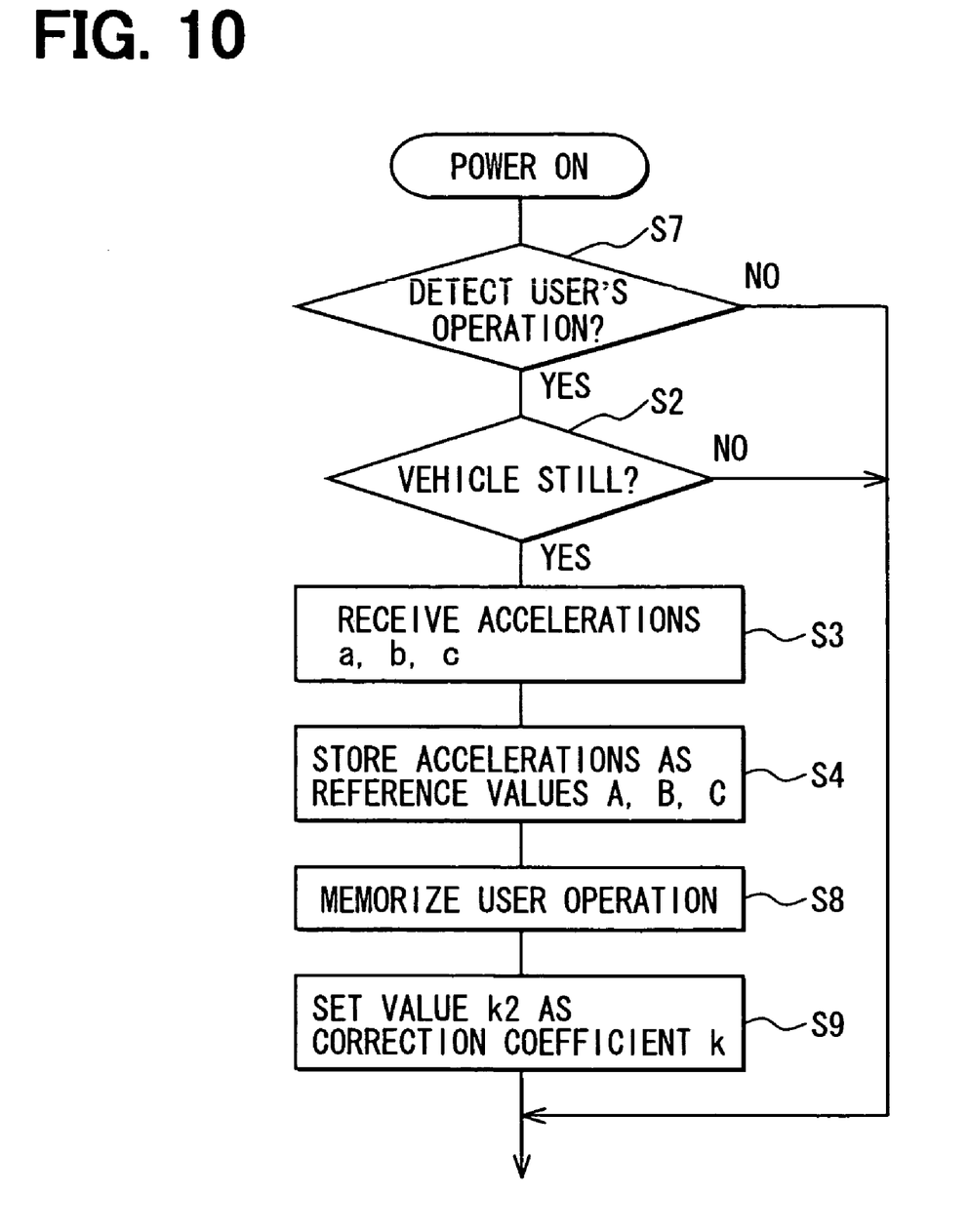
FIG. 10 is a flowchart showing an operation according to a second embodiment of the present invention for obtaining reference orientation values.

After the process shown in FIG. 10, the navigation controller 3 of this embodiment operates in the same way as that of the first embodiment, as shown in FIGS. 8 and 9. At Step T7 in the process shown in FIG. 8, the navigation controller 3 uses the power-on value k2 as the correction coefficient k. The power-on value k2 may be less than one tenth of several percents of the A, B, and C.

As described above, it is not certain in the first embodiment whether the vehicle 1 was in a horizontal orientation when the automatic reference orientation values are obtained and memorized. Thus, the automatic reference orientation values may include errors. It is therefore necessary to set the weight k (i.e. power-on value k1) relatively larger in calculating the weighted averages in order to quickly achieve convergence of error correction.

In contrast, the navigation controller 3 of the second embodiment obtains and memorizes the operated reference orientation values A, B, and C when the navigation controller 3 detects that the vehicle 1 is in a horizontal orientation. The operated reference orientation values A, B, and C therefore include relatively small errors. Errors in the calculated travel distance and current position of the vehicle 1 are therefore small even if the weight k (i.e. power-on value k2) is relatively smaller than the weight k (i.e. power-on value k1) in the first embodiment. Since the power-on value k2 is relatively smaller, it is possible to prevent the errors in the corrected reference orientation values A, B, and C from growing.

In this embodiment, the navigation controller 3 may obtain and memorize the operated reference orientation values A, B, and C irrespective of whether the vehicle 1 is keeping still.

Third Embodiment

Figure 11:
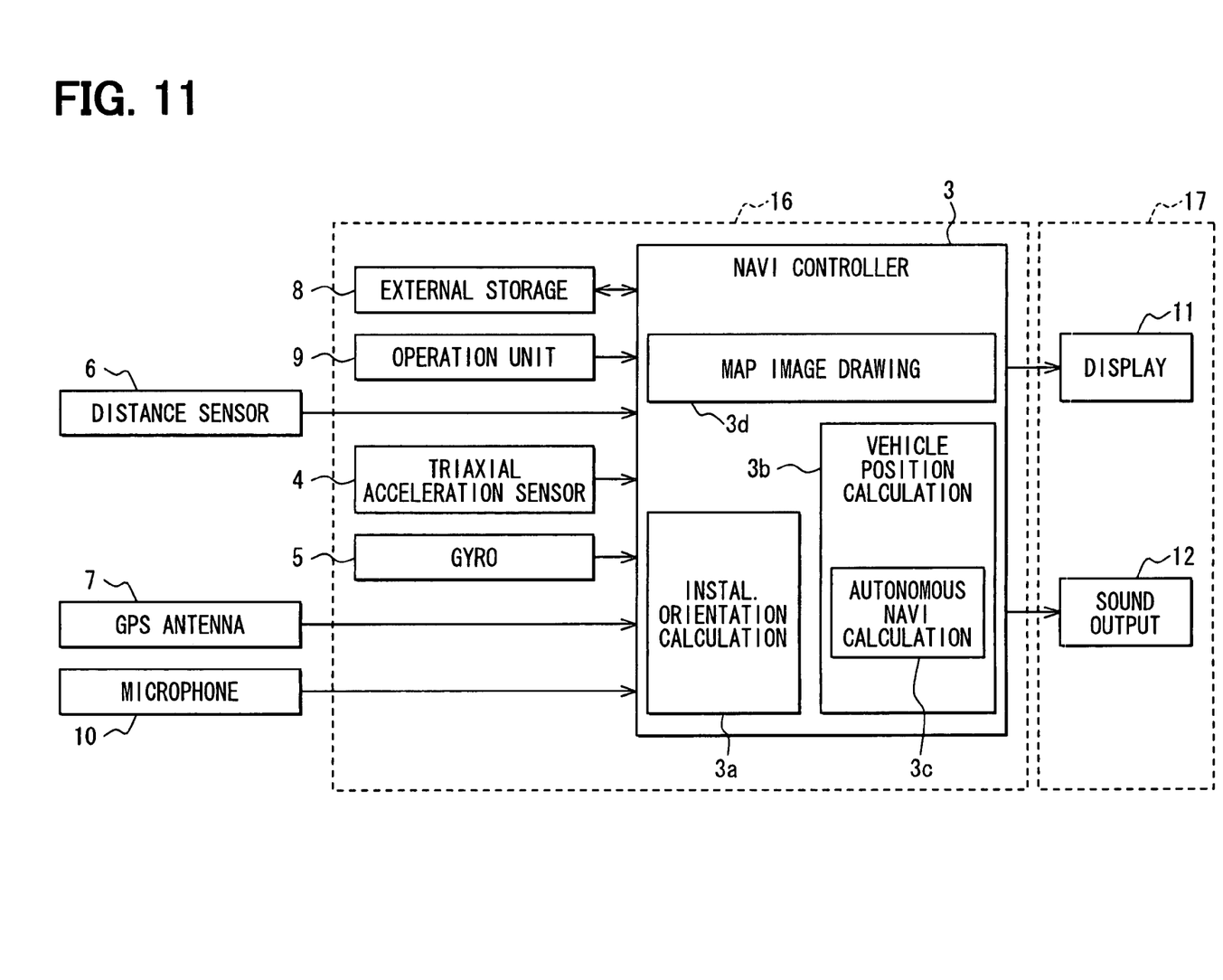
FIG. 11 is a block diagram showing a navigation device according to a third embodiment.

Hereinafter, a third embodiment of the present invention will be described with reference to FIG. 11. In FIG. 11, the same component as that in FIG. 1 has the same reference number as that in FIG. 1. A navigation device 16 has the same configuration with the navigation device 2 of the first embodiment except for that the navigation device 16 is separated from display 11 and sound output device 12. An information output device 17 includes the display 11 and the sound output device 12; the device 17 is installed in the passenger's compartment of the vehicle 1 separately from the navigation device 16. The navigation device 16 and the information output device 17 are connected with each other directly, through a wired or wireless network in the vehicle 1.

According to this embodiment, the navigation device 16 may be located, for example, below a passenger's seat or in a trunk room. Restriction on the location of the navigation device 16 is therefore reduced. In addition, it is possible to manufacture an information output device 17 so that it can be detachable from a navigation device 16 as needed. In this case, the location of the information output device 17 can be moved anywhere inside of the passenger's compartment.

Other

The present invention should not be limited to the embodiment discussed above and shown in the drawings, but may be implemented in various ways without departing from the spirit of the invention.

For example, the navigation device 2 may obtain and store the reference orientation values A, B, and C in both occasions when the navigation device 2 is supplied with the electric power for the first time after the navigation device 2 is installed into the vehicle 1 and when the user makes an operation and the vehicle 1 is keeping still.

In the process for correcting the reference values A, B, and C while the vehicle 1 is traveling, the navigation controller 3 may use the averages of respective outputs a (or a'), b, and c. This is, as described before, because an average tilt of the roads (or the vehicle 1) becomes almost zero (i.e. horizontal) when the vehicle 1 undergoes a long travel. Therefore, the navigation controller 3 need not calculate the weighted averages and may use any other digital filtering processes to correct the reference values A, B, and C.

In calculating the weighted averages, the correction coefficient k and the number n of the data used for the averages of outputs a', b, and c are not limited to specific values. They can be set to any other values if the values n and k are sufficient for the navigation controller 3 to execute a sufficient filtering process, in other words, if an average tilt of the road corresponding to the values n and k which the navigation controller 3 uses becomes almost zero.

After the reference orientation values A, B, and C are set, the navigation controller 3 may change (for example, decrease) the correction coefficient k as the travel distance gets longer, in other words, the errors become smaller. When the vehicle 1 travels on a road with many external disturbances, the navigation controller 3 may stop correcting the reference orientation values A, B, and C. For example, when the navigation controller 3 determines based on the map data that the vehicle 1 is traveling in a mountain area, it may stop correcting the reference orientation values A, B, and C until the vehicle 1 gets out of the mountain area.

The triaxial acceleration sensor 4 does not have to be installed in the casing 13. The triaxial acceleration sensor 4 may be installed separately from the navigation device 2.

The acceleration sensor 4 is not limited to the triaxial acceleration sensor. The acceleration sensor 4 may detect an acceleration in only one direction (for example, the front-rear direction).

The navigation device 2 is not limited to have the gyro sensor 5. The device 2 is not limited to calculate the current position of the vehicle. The device 2 is not limited to use the determined orientation of the traveling vehicle 1 for correcting the travel distance of the vehicle.

Each or any combination of processes or steps explained in the above can be achieved as a software unit (e.g., subroutine) or a hardware unit (e.g., circuit or integrated circuit), including or not including a function of a related device; furthermore, the hardware unit can be constructed inside of a microcomputer.

What is claimed is:

1. A navigation device in a vehicle including a distance sensor for detecting a travel distance of the vehicle, the navigation device comprising:

an acceleration sensor that generates outputs of accelerations in a front-rear, a lateral, and a vertical directions of the acceleration sensor; and a correction unit that detects a first group of outputs of the acceleration sensor with respect to the three directions, the first group including information on an orientation of the acceleration sensor relative to the vehicle, memorizes the first group as reference orientation values, corrects the memorized reference orientation values with respect to the three directions, based on three averages of outputs generated by the acceleration sensor while the vehicle travels after the first group are generated, each average being an average of outputs with respect to each of the three directions, determines an orientation of the vehicle when the vehicle travels, based on (i) the corrected reference orientation values and (ii) a second group of outputs of the acceleration sensor with respect to the three directions, and corrects a travel distance detected by the distance sensor, based on the determined orientation of the vehicle.

2. The navigation device of claim 1, wherein the acceleration sensor is fixed in a casing of the navigation device, the orientation of the acceleration sensor is detected as an orientation of the casing.

3. The navigation device of claim 2, further comprising:

a gyro sensor fixed in the casing and used to detect an orientation of the vehicle.

4. The navigation device of claim 3, further comprising:

a position calculation unit that calculates a position of the vehicle based on outputs of the acceleration sensor, the distance sensor, and the gyro sensor.

5. The navigation device of claim 1, wherein the correction unit memorizes the detected first group when the vehicle is stopping after the navigation device is supplied with electric power for a first time since the navigation device is provided in the vehicle.

6. The navigation device of claim 1, further comprising an operation unit that inputs an instruction by a user who has determined that the vehicle is in a horizontal orientation, wherein the correction unit memorizes the detected first group when the instruction is inputted by the operation unit.

7. The navigation device of claim 1, wherein the correction unit corrects the memorized reference orientation values by calculating three weighted averages, each of which is, with respect to each of the three directions, a weighted average of both the reference orientation value and the average of outputs.

8. The navigation device of claim 1, wherein the correction unit calculates a given acceleration caused by a change in a speed of the vehicle, based on a travel time and a travel distance obtained based on the distance sensor, and calculates an average of differences as a first average with respect to the front-rear direction of the three averages, each of the differences being obtained by subtracting the calculated given acceleration from an output of the acceleration sensor in the front-rear direction.

9. The navigation device of claim 1, wherein the outputs of the acceleration sensor used for calculating each of the three averages are within a predetermined range including the corresponding reference orientation value of the three reference orientation values.

10. The navigation device of claim 1, wherein the correction unit memorizes the detected first group when one of a first and a second conditions is satisfied, the first condition is satisfied when the vehicle is stopping after the navigation device is supplied with electric power for a first time since the navigation device is provided in the vehicle, the second condition is satisfied when an operation unit inputs an instruction by a user who has determined that the vehicle is in a horizontal orientation, the correction unit corrects the memorized reference orientation values by calculating three weighted averages, each of which is, with respect to each of the three directions, a weighted average of both the reference orientation value and the average of outputs by using one of a first and a second coefficients for weighting the average of outputs, and the second coefficient corresponding to the second condition is smaller than the first coefficient corresponding to the first condition.

11. The navigation device of claim 3, wherein the correction unit detects the orientation of the casing, and corrects, based on the detected orientation of the casing, a heading direction of the vehicle obtained based on an output of the gyro sensor.

12. The navigation device according to claim 4, further comprising:

a displaying unit for displaying a map image; and a map image drawing unit for causing the displaying unit to display a current position mark and a map image including a current position of the vehicle calculated by the position calculation unit.

13. A navigation device in a vehicle including a distance sensor for detecting a travel distance of the vehicle, the navigation device comprising:

an acceleration sensor that generates an output of an acceleration in a front-rear direction of the acceleration sensor, the output including information on an orientation of the acceleration sensor relative to the vehicle; and a correction unit that detects a first output of the acceleration sensor, memorizes the first output as a reference orientation value, corrects the memorized reference orientation value, based on an average of outputs generated by the acceleration sensor while the vehicle travels after the first output is generated, determines an orientation of the vehicle when the vehicle travels, based on (i) the corrected reference orientation value and (ii) a second output of the acceleration sensor, and corrects a travel distance detected by the distance sensor, based on the determined orientation of the vehicle.

14. A method for determining an orientation of a vehicle including an acceleration sensor that generates an output of an acceleration in a direction of the acceleration sensor, the output including information on an orientation of the acceleration sensor relative to the vehicle, the method comprising:

detecting a first output of the acceleration sensor;

memorizing the first output as a reference orientation value, correcting the memorized reference orientation value, based on an average of outputs generated by the acceleration sensor while the vehicle travels after the first output is generated; and determining an orientation of the vehicle when the vehicle travels, based on (i) the corrected reference orientation value and (ii) a second output of the acceleration sensor.

* * * * *